(12) United States Patent
Fuller et al.

(10) Patent No.: US 7,348,491 B2
(45) Date of Patent: *Mar. 25, 2008

(54) MOTOR VEHICLE WIRING HARNESS HAVING A GROMMET BETWEEN OCCUPANT AND ENGINE COMPARTMENTS

(75) Inventors: Steven W. Fuller, Leo, IN (US); Douglas A. Schlaudroff, Fort Wayne, IN (US); Jerald J. Bultemeier, Decatur, IN (US); Chad E. Jagger, Columbia City, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 47 days.

This patent is subject to a terminal disclaimer.

(21) Appl. No.: 11/207,459

(22) Filed: Aug. 19, 2005

(65) Prior Publication Data

US 2007/0039751 A1    Feb. 22, 2007

(51) Int. Cl.
*H01B 17/26* (2006.01)
(52) U.S. Cl. .................. 174/152 G; 174/668; 174/665; 174/153 G
(58) Field of Classification Search ............ 174/153 G, 174/152 G, 153 R, 151, 668, 665, 663, 656, 174/651, 650; 16/2.1; 248/56; 285/179
See application file for complete search history.

(56) References Cited

U.S. PATENT DOCUMENTS

| | | | |
|---|---|---|---|
| 5,270,487 A | | 12/1993 | Sawamura |
| 5,639,993 A | * | 6/1997 | Ideno et al. ............ 174/153 G |
| 6,248,952 B1 | * | 6/2001 | Reeves et al. ............ 174/663 |
| 6,402,155 B2 | | 6/2002 | Sakata |
| 2002/0112317 A1 | * | 8/2002 | Hayashi ..................... 16/86 C |

* cited by examiner

*Primary Examiner*—Jinhee J. Lee
(74) *Attorney, Agent, or Firm*—Jeffrey P. Calfa; Gerald W. Askew

(57) ABSTRACT

A truck has an occupant compartment (24), an engine compartment (20) forward of the occupant compartment, and a wiring harness (34) extending through a dash panel (26) separating the two compartments from each other. A grommet (46) is secured at a fixed location on a wire bundle (42) that passes through the grommet. The dash has a through-opening in which the grommet seats, and the engine compartment side of the grommet includes a bend (48) that curves generally downward and away from the dash to direct the bundle generally downward on the engine compartment side.

20 Claims, 6 Drawing Sheets

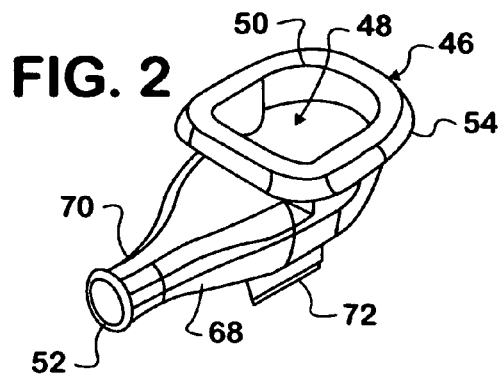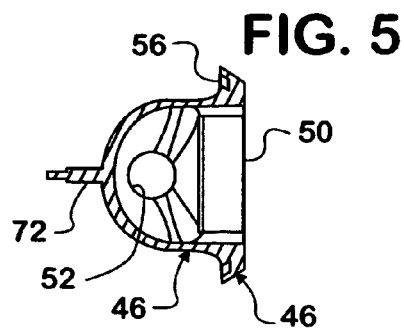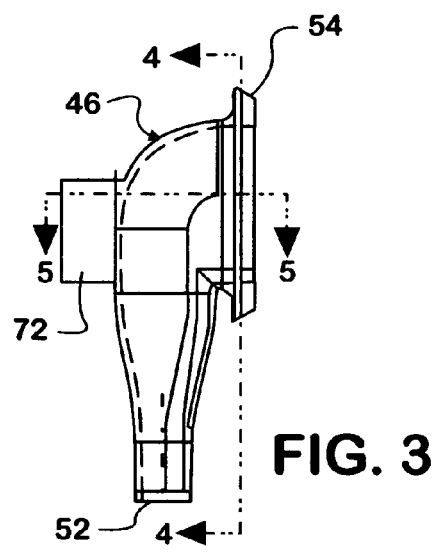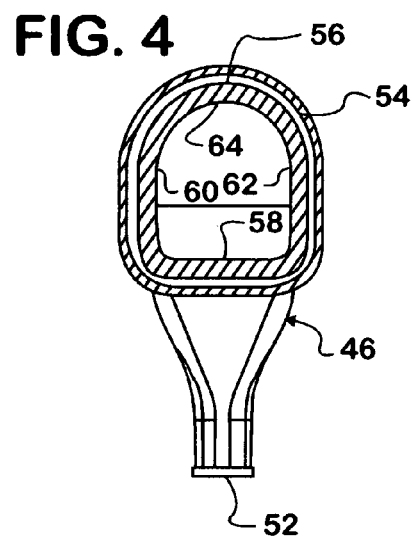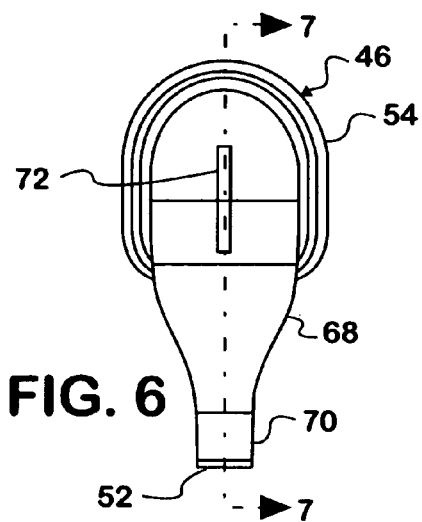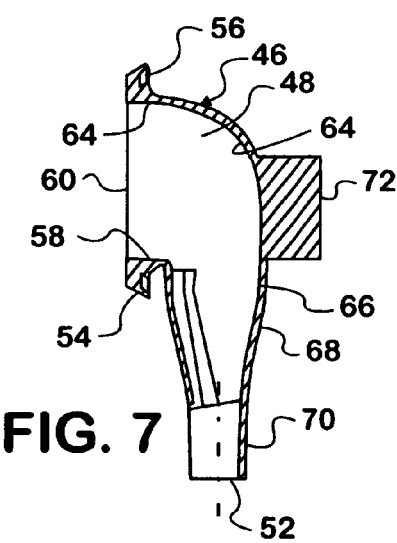

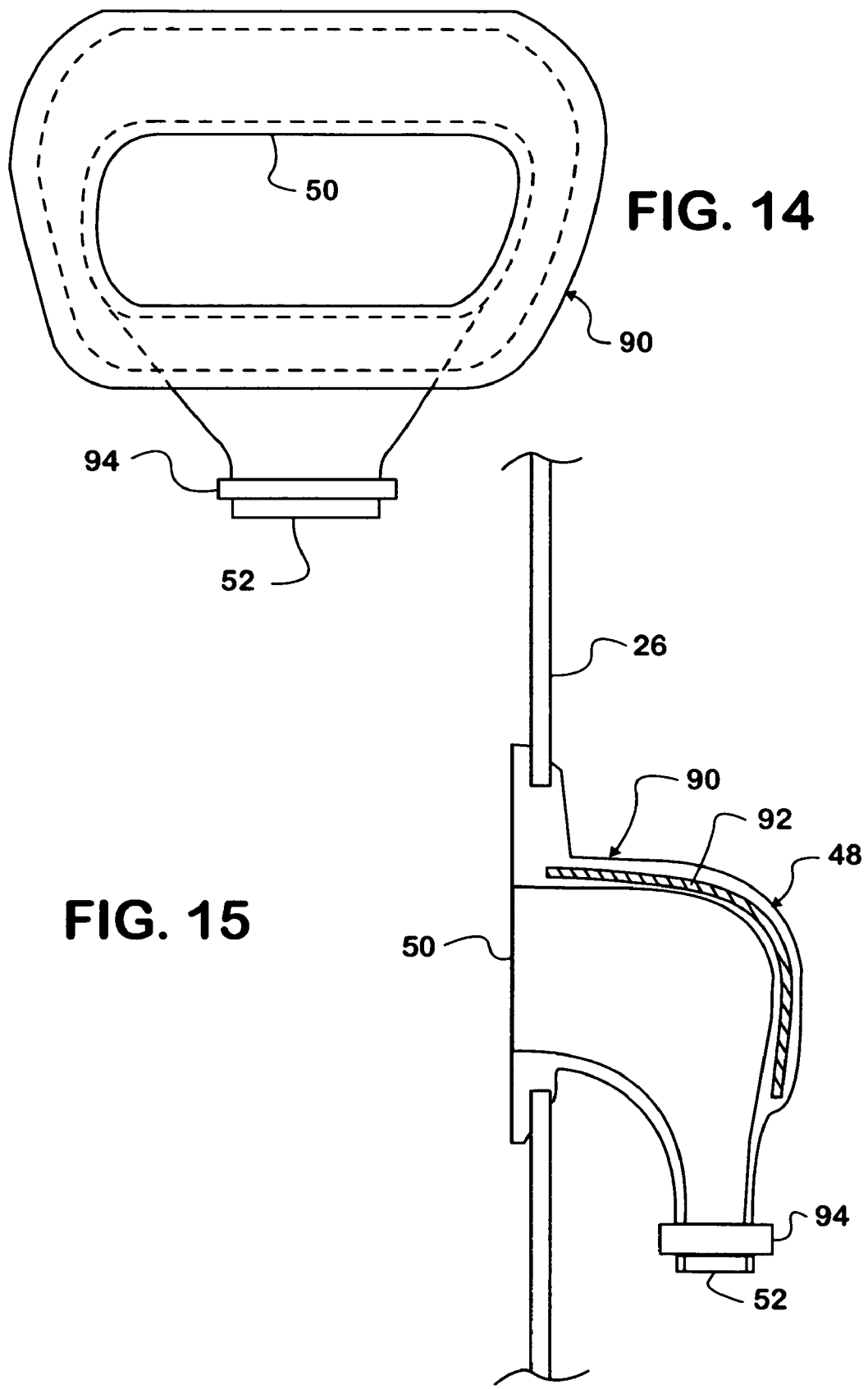

MOTOR VEHICLE WIRING HARNESS HAVING A GROMMET BETWEEN OCCUPANT AND ENGINE COMPARTMENTS

FIELD OF THE INVENTION

This invention relates to the routing of electrical wiring harnesses in motor vehicles, and in particular to a wiring harness having a grommet that mounts in a through-opening in a dash panel and through which a wire bundle is routed between an occupant compartment and an engine compartment.

BACKGROUND OF THE INVENTION

Most motor vehicles that operate on roads and highways typically have an occupant compartment, where the driver and any passenger or passengers sit, and in front of the occupant compartment, an engine compartment for housing the engine that propels the vehicle.

Certain electrical devices, such as driver information displays and various controls, are present inside the occupant compartment. Certain ones of those devices need to be in electrical communication with vehicle components that are disposed outside the occupant compartment. Those components include the engine and the transmission through which the engine is coupled with the drivetrain.

Consequently it is common practice to bundle wires into wiring harnesses having some connectors that make connections to electrical devices inside the occupant compartment and other connectors that make connections to components that are outside the occupant compartment. Necessarily, such harnesses must pass through a wall shared by the two compartments. Such a wall is sometimes referred to as a dash panel, or simply a dash.

Because a number of vehicle components and systems are disposed on or in close proximity to the dash, available space for routing wiring harnesses through the dash is typically at a premium. The location of a wiring harness pass-through in the dash is not the only consideration in the design phase of motor vehicles; the nature of the pass-though is also a consideration.

One type of pass-through comprises a grommet that fits to a through-opening in the dash and through which bundled wires pass. Such a grommet may be affixed in some suitable way to the bundled wires so as to be immovable along the length of the harness. Installation of such a harness involves feeding one or more connectors through the through-opening and then pulling the harness until the grommet seats in the through-opening. In that type of pass-through, any connector that must be fed through the dash opening must be small enough in size to freely pass through.

Another type of pass-through is somewhat different in that the through-opening in the dash serves as the location where a harness that is inside the occupant compartment mates with a harness that extends into the engine compartment. Mating of the two harnesses is via one connector in one harness mating with another connector in the other harness at the dash. These are sometimes referred to as bulkhead connectors. For example, the occupant compartment harness can terminate in a connector that fits to the through-opening on one side of the dash and is mounted in any suitable way to the dash. The other harness terminates in a mating connector that plugs into the connector on the occupant compartment side of the dash. This type of pass-through is typically more expensive not only because the bulkhead connectors are required, but because other design and manufacturing issues often arise.

One of those other issues may be the sequence of steps in assembling a vehicle. Certain motor vehicles have what is sometimes called a body-frame construction. A frame provides the structure for mounting chassis components that form the vehicle powertrain. A body forms the occupant compartment, and at some point in the vehicle assembly process, the body is placed on and fastened to the frame. In the case of a truck, the body is sometimes referred to as the cab.

Assuming that many powertrain components, including the engine, transmission, and drivetrain, have been already mounted on the frame at the time that the body is placed on the frame, it then becomes necessary to make connection of engine compartment wiring harness connectors with corresponding occupant compartment wiring harness connectors. Available space considerations after body placement may render it difficult for assembly line personnel to efficiently make those connections.

Certain vehicle models that use essentially the same platform may have different electrical devices and components from vehicle to vehicle. Consequently, while the vehicles are generally similar, the wiring may differ from vehicle to vehicle. This means that some wiring harnesses may have more wires in a bundle and other harnesses fewer wires. Consequently, the diameter of a wiring harness passing through the dash in some vehicles will be larger than in others. The wiring harness through-openings in a dash panel are typically created at the time the dash panel is manufactured, typically by punching in sheet metal during the dash panel stamping process. While it would be possible to manufacture dash panels with different sized wiring harness through-openings, that would introduce complexities that would far outweigh the benefits. Therefore it is typical for a wiring harness through-opening in a dash that is common to different vehicle models to have a common size that can accommodate wire bundles of different diameters depending on the particular number and size of wires in a harness needed to satisfy requirements for the respective models and their electrical equipment.

Sealing of a grommet to bundled wires in a wiring harness may also be important in order to provide weather- and sound-tightness through the grommet. U.S. Pat. Nos. 5,270,487 and 6,402,155 are examples of grommets that have sealant within the grommet that aids in sealing to the wire bundle passing through the grommet opening.

SUMMARY OF THE INVENTION

The present invention relates to a novel grommet, wiring harness, and installation in a motor vehicle. The invention allows an occupant compartment wiring harness to extend through a dash and some distance into the engine compartment where it can be conveniently connected with a mating harness to electrically connect electrical devices inside the occupant compartment with vehicle components that are disposed outside the occupant compartment.

The invention is especially suitable for use with pre-existing vehicle platforms and models to allow new electrical features, components, and devices to be incorporated without extensive re-design of major body components like a dash panel and cowl tray for example as well as major systems like a HVAC system that are closely integrated with the dash panel. Avoiding extensive structural re-design avoids the costs that would be associated with new or redesigned tooling.

The invention provides for a single size grommet to accommodate wiring harnesses of different diameter while enabling suitable sealing between the grommet and the wire bundle passing through the grommet to be conveniently achieved. The grommet also has a configuration that when installed in a dash through-opening directs the wire bundle generally downward thereby also tending to shed away water, road splash, etc.

A wiring harness comprising such a grommet allows connections to be made inside the occupant compartment to electrical devices inside the occupant compartment and an engine compartment connector, or connectors, to be passed through a dash panel through-opening. On the engine side of the dash, the harness is pulled through until the grommet reaches the dash at which point it is manipulated to seat it in the through-opening. Preferably, the shape of the through-opening is polarized so that the grommet can seat in the through-opening in a specific orientation where the portion of the grommet on the engine compartment side of the dash will curve about 90° and extend generally downward.

The downwardly extending portion of the grommet on the engine compartment side forms a collar around the wiring harness bundle, and by making the collar sufficiently deformable, it can be banded by a strap that girdles and is tightened around the collar to force the collar against bundle, thereby aiding in sealing the grommet to the bundle and in assuring that the grommet is located at a desired location along the length of the harness.

Because the grommet need not be molded onto the wiring bundle, a wiring harness that includes the grommet can, within limits, comprise different numbers and sizes of wires. This allows such a harness to be fabricated at a harness maker by threading insulated wires individually, or in groups that may or may not be protectively wrapped, through the grommet, and connectors assembled to the stripped ends of the wires after the wires have been so threaded.

One generic aspect of the present invention relates to a motor vehicle comprising an occupant compartment, an engine compartment forward of the occupant compartment, and a wiring harness extending through a wall separating the two compartments from each other. A grommet is secured at a fixed location on a wire bundle that passes through the grommet. The wall comprises a through-opening in which the grommet seats, and the engine compartment side of the grommet comprises a bend that curves generally downward and away from the wall to direct the bundle generally downward on the engine compartment side.

Another generic aspect of the present invention relates to a motor vehicle wiring harness comprising a wire bundle having connectors at opposite ends and a grommet that comprises a through-passage through which the wire bundle passes and that is secured at a fixed location on the wire bundle intermediate the connectors at opposite ends. The through-passage comprises a curved bend, and the grommet comprises, on its exterior, an endless perimeter lip comprising an endless perimeter groove for seating the grommet in a through-opening in a wall of a motor vehicle.

Still another generic aspect of the present invention relates to a method of installing a wiring harness in a motor vehicle that has an interior compartment, an exterior compartment adjacent the interior compartment, and a wall separating the two compartments from each other. The method comprises passing one or more connectors at one end of a wire bundle through a through-opening in the wall in a direction from one compartment to the other. Then advancing more of the wire bundle through the through-opening in the same direction until the wire bundle has been advanced sufficiently to place a grommet that has a substantially right angle curved bend, through and along which the wire bundle passes, immediately proximate the through-opening on one side of the wall. Then one end of the grommet is inserted into and through the through-opening, and the grommet is advanced further to pass its curved bend through the through-opening until the curved bend is disposed on the other side of the wall so as to direct the wire bundle exiting the one end of the grommet in the other compartment substantially at a right angle to the wire bundle exiting an opposite end of the grommet in the one compartment.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 2 is perspective view showing a grommet that is on the wiring harness.

FIG. 3 is a side elevation view of the grommet.

FIG. 4 is a view in the direction of arrows 4-4 in FIG. 3.

FIG. 5 is a view in the direction of arrows 5-5 in FIG. 3.

FIG. 6 is a left side view of FIG. 3.

FIG. 7 is a view in the direction of arrows 7-7 in FIG. 6.

FIG. 14 is a view in the same direction as FIG. 13 showing a third embodiment of grommet.

FIG. 15 is a right side view of FIG. 14, partly in cross section.

DESCRIPTION OF THE PREFERRED EMBODIMENT

Figure 1:
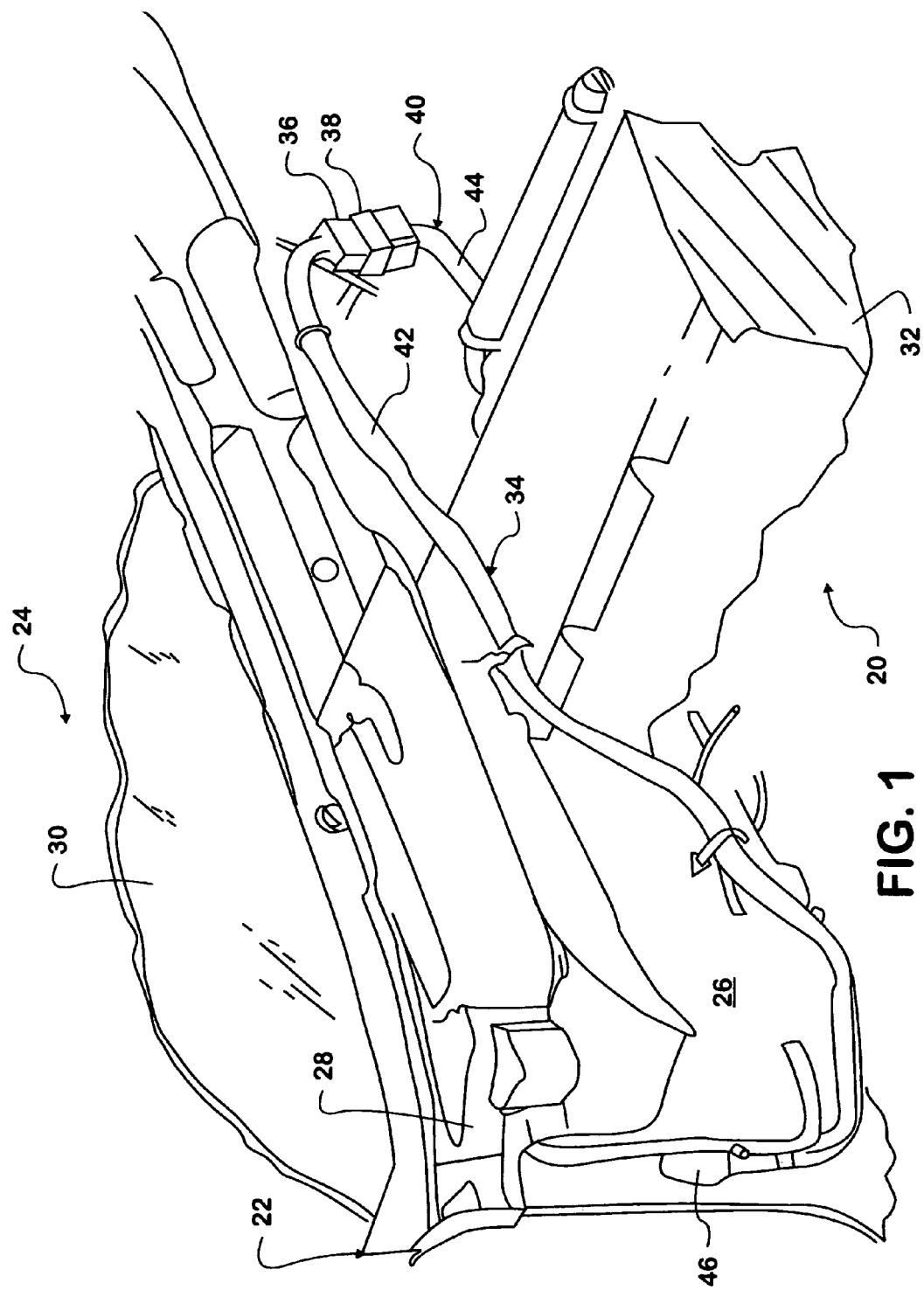
FIG. 1 is a perspective view of a portion of the interior of a truck's engine compartment showing a portion of a wiring harness embodying principles of the invention.
Figure 8:
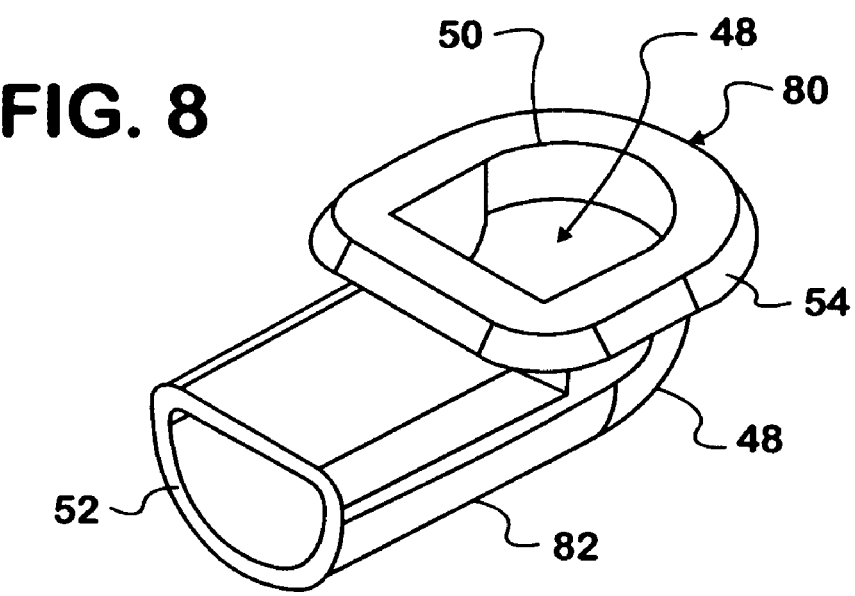
FIG. 8 is a view similar to FIG. 2 showing another embodiment of grommet.
Figure 13:
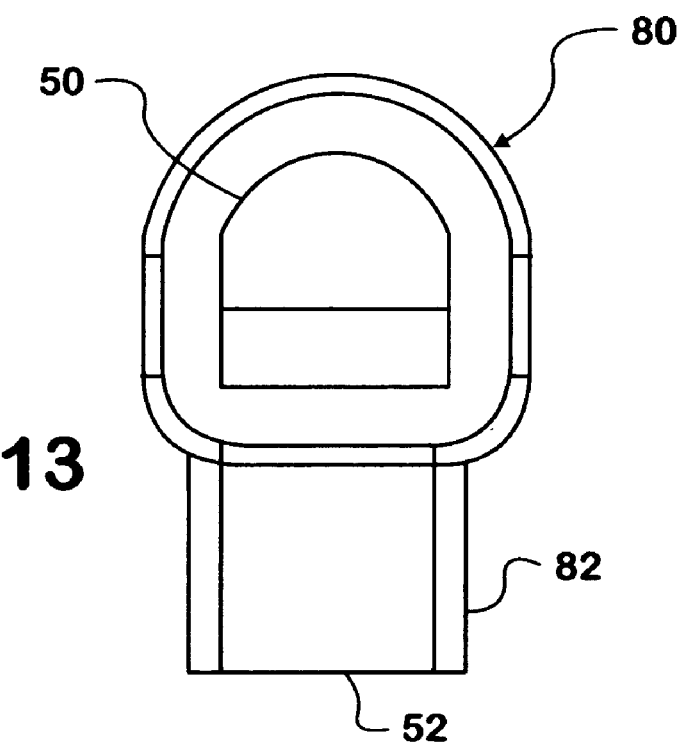
FIG. 13 is a right side view of FIG. 9.
Figure 10:
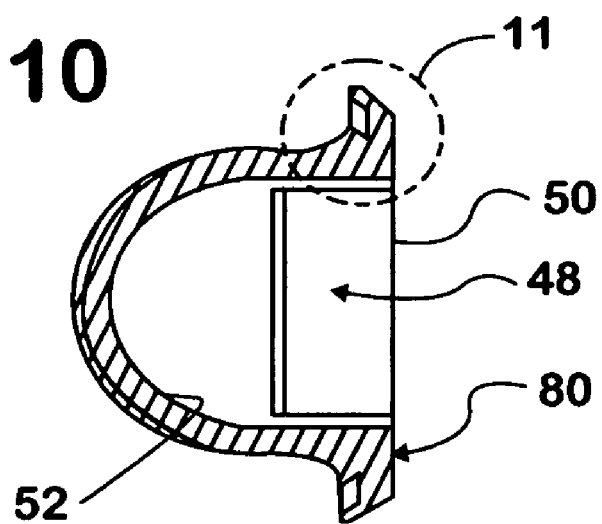
FIG. 10 is a view in the direction of arrows 10-10 in FIG. 9.
Figure 9:
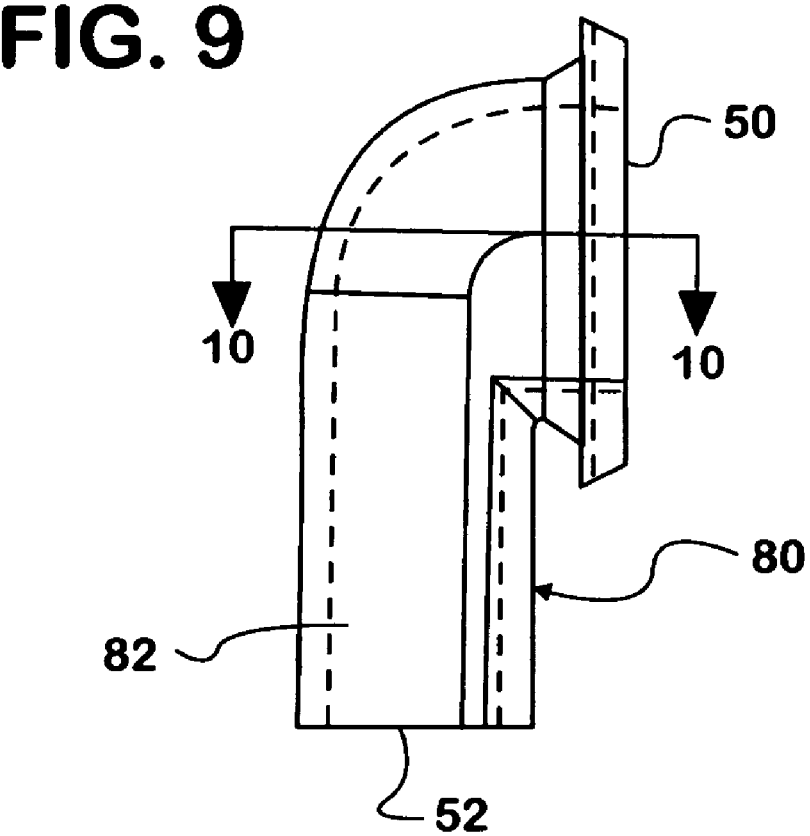
FIG. 9 is a side elevation view of the grommet of FIG. 8.

FIG. 1 shows a portion of an engine compartment 20 of a highway truck 22 that is forward of an occupant compartment 24. A dash 26 separates the two compartments below a cowl area 28 and windshield 30. Engine compartment 20 houses an engine 32 that forms part of the truck's powertrain.

One portion of a wiring harness 34 is disposed inside occupant compartment 24 and can't be specifically seen in FIG. 1. Another portion of wiring harness 34 is disposed in engine compartment 20 and can be seen in FIG. 1. The latter portion extends from dash 26 some distance into engine compartment 20 where it terminates in a connector 36 shown mated with another connector 38. Connector 38 is part of an engine/powertrain wiring harness 40 that has other connectors (not visible in FIG. 1) that connect with vehicle electrical components that are disposed either in engine compartment 20 or the underlying chassis. With the two harnesses 34, 40 connected together, electrical devices inside occupant compartment 24 are electrically connected with electrical components outside the occupant compartment.

Each harness 34, 40 comprises a respective wire bundle 42, 44 that may be protectively wrapped. Harness 34 further comprises a grommet 46 that mounts the harness on dash 26 on a lateral side of the vehicle fore-aft centerline opposite the side where connectors 36, 38 make connection to each other. Grommet 46 has a construction that directs wire bundle 42 generally downward as it enters engine compartment 20. Grommet 46 is shown by itself in more detail in FIGS. 2-7.

Those Figures show grommet 46 to comprise a through-passage 48 having opposite ends 50 and 52 where wire bundle 42 enters and exits. An endless perimeter lip 54 comprising an endless perimeter groove 56 surrounds end 50. At end 50, through-passage 48 has a transverse cross sectional shape that is defined by a horizontal lower edge 58, side edges 60, 62 extending upward from opposite ends of edge 58 at substantially right angles to edge 58, and a downwardly concave upper edge 64 extending between upper ends of side edges 60, 62. At end 50, through-passage 48 has a transverse cross section whose area is larger than that of the through-passage at end 52.

Immediately beyond lip 54, the wall of grommet 46 that defines through-passage 48 comprises a 90° bend 64. The transverse cross section of the through-passage progressively diminishes throughout the 90° of the bend until the bend merges into an initially circular walled section 66 that continues downward in a narrowing tapered section 68 that leads to a short straight circular section 70 ending at end 52.

The downwardly extending portion of grommet 46 on the engine compartment side of dash 26 that comprises sections 66, 68, 70 forms a collar around the wiring harness bundle. In grommet 46, section 70 may be considered to be the collar. By making the collar sufficiently deformable, it can be banded by a strap (like the one shown in FIG. 15) that girdles and is tightened around the collar to force the collar against the wire bundle passing through the grommet, thereby aiding in sealing the grommet to the bundle and in assuring that the grommet is located at a desired location along the length of the harness.

Dash 26 comprises a through-opening in which grommet 46 seats. The shape of the through-opening is substantially congruent with that of groove 56 so as to allow the margin of the through-opening to lodge in groove 56 when grommet 46 is seated in the through-opening. The shape of the through-opening in dash 26 is polarized so that grommet 46 can seat in the through-opening only in a unique orientation where the portion of the grommet on the engine compartment side of the dash will curve about 90° and extend generally downward, as shown in FIG. 1.

Because grommet 46 is not molded onto wire bundle 42, a wiring harness that includes grommet 46 can, within limits, comprise different numbers and sizes of wires. This allows a harness like harness 34 to be fabricated at a harness maker by threading insulated wires individually, or in groups that may or may not be protectively wrapped, through the grommet, and connectors assembled to the stripped ends of the wires after the wires have been so threaded.

Wiring harness 34 can be connected to devices inside occupant compartment 24, and connector 36 can be passed through the dash through-opening in the direction from occupant compartment 24 to engine compartment 20. On the engine side of dash 26, harness 34 can be pulled through until grommet 46 reaches the through-opening in dash 26, at which point the grommet is manipulated to seat it in the through-opening. 12. Seating can be facilitated by personnel who install the harness manually grasping a tab 72 on the exterior of the grommet wall at bend 64 opposite the dash through-opening and pulling the grommet into seating in the through-opening. Then connectors 36, 38 can be mated.

Figure 11:
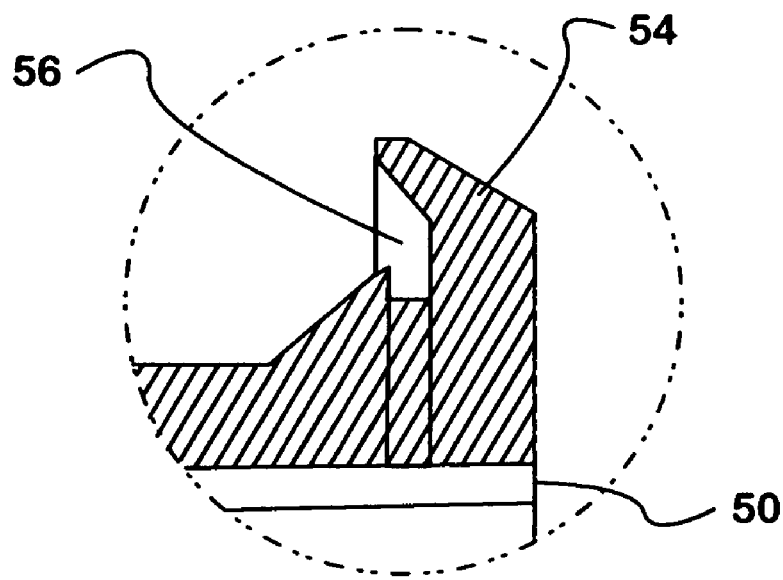
FIG. 11 is an enlarged view in circle 11 in FIG. 10.
Figure 12:
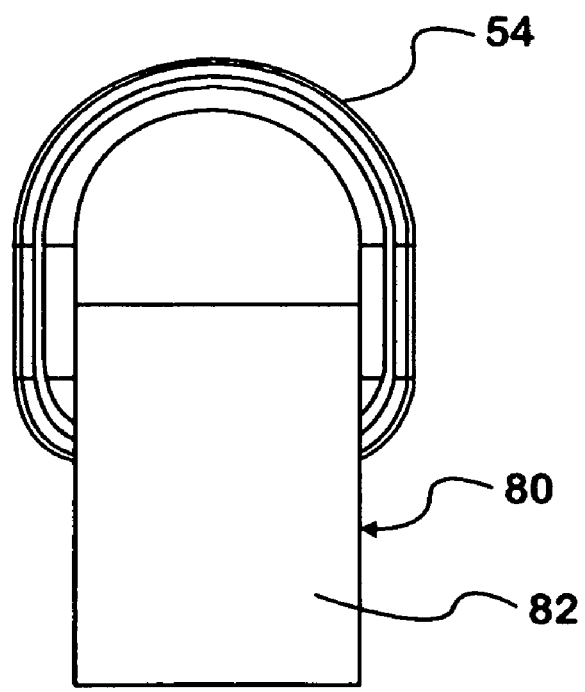
FIG. 12 is a left side view of FIG. 9.

FIGS. 8-13 show another embodiment of grommet 80 that is like grommet 46. It differs in that beyond bend 48, the section 82 that extends vertically downward is not tapered, but rather has a constant cross section. FIG. 11 shows more detail of lip 54 and groove 56.

FIGS. 14-15 show another embodiment of grommet 90 that is generally like grommet 46. It differs in certain details such as the shape of end 50, and in the inclusion of an insert 92 that gives shape to bend 48. It does show a strap 94 banding the grommet to the wire bundle immediately proximate end 52.

While a presently preferred embodiment of the invention has been illustrated and described, it should be appreciated that principles of the invention apply to all embodiments falling within the scope of the following claims.

What is claimed is:

1. A motor vehicle comprising:
   an occupant compartment;
   an engine compartment forward of the occupant compartment;
   and a wiring harness extending through a wall separating the occupant compartment and the engine compartment from each other;
   wherein the wiring harness comprises a grommet through which a wire bundle passes and which comprises an outer perimeter lip having a polarized endless groove seating the grommet in a through-opening in the wall, the through-opening comprising an endless perimeter that is polarized similarly to the polarized groove in the lip to allow the grommet to seat in the through-opening only in an orientation that causes a bend in the grommet on the engine compartment side of the through-opening to curve downwardly and away from the wall.

2. A motor vehicle as set forth in claim 1 wherein the through-opening is disposed to one lateral side of the vehicle fore-aft centerline, and the wire bundle has a length extending from the grommet to terminate in one or more connectors connecting to one or more mating connectors of another wiring harness on the other lateral side of the vehicle fore-aft centerline.

3. A motor vehicle as set forth in claim 2 wherein the another wiring harness comprises a powertrain wiring harness comprising the one or more mating connectors of another wiring harness and those one or more mating connectors are mated with the one or more connectors of the wire bundle to connect wires in the wire bundle to one or more powertrain electrical components.

4. A motor vehicle as set forth in claim 1 wherein the outer perimeter lip surrounds an entrance for the wire bundle on the occupant compartment side of the wall, and the entrance has a transverse cross section that is larger in area than the transverse cross section of an exit through which the bundle exits the grommet on the engine compartment side of the wall.

5. A motor vehicle as set forth in claim 4 wherein the grommet entrance has a shape defined by a horizontal lower edge, side edges extending upward from opposite ends of the horizontal lower edge, and a downwardly concave upper edge extending between upper ends of the side edges.

6. A motor vehicle as set forth in claim 5 wherein the side edges are at substantially right angles to the horizontal lower edge.

7. A motor vehicle as set forth in claim 4 wherein the outer perimeter lip of the grommet and the polarized endless groove are arranged in relation to the through-opening such that the grommet is seated in the through-opening by first passing one or more connectors on an engine compartment end of the wire bundle through the through-opening from the occupant compartment into the engine compartment, then advancing more of the wire bundle through the through-opening in the same direction, and when the wire bundle has been advanced sufficiently to place the grommet immediately proximate the through-opening on the occupant compartment side of the wall, inserting the engine compartment side of the grommet into and through the through-opening, and causing the margin of the through-opening to lodge in the polarized endless groove thereby seating the grommet in the through-opening.

8. A motor vehicle as set forth in claim 1 wherein the bend in the grommet curves downward to end vertically no lower than the through-opening, and the engine compartment side of the grommet comprises a vertical extension that continues vertically downward beyond the bend.

9. A motor vehicle as set forth in claim 8 wherein the vertical extension that continues vertically downward beyond the bend has a narrowing taper in the downward direction.

10. A motor vehicle as set forth in claim 9 further including a strap that girdles the outside of a relatively more narrow portion of the narrowing taper of the extension to tightly band the extension to the wire bundle.

11. A motor vehicle as set forth in claim 8 including a tab on the exterior of the bend opposite the through-opening that can be gripped for pulling the grommet into seating in the through-opening.

12. A motor vehicle wiring harness comprising: a wire bundle having connectors at opposite ends; and a grommet comprising a through-passage which includes a curved bend and through which the wire bundle passes, the grommet being secured in a fixed location along the length of the wire bundle, the grommet comprising a polarized endless perimeter lip comprising a polarized endless perimeter groove, for seating the grommet in a similarly-polarized endless perimeter through-opening in a wall in a motor vehicle so that the grommet can seat only in a unique orientation that places the through-passage to one side of the through-opening with the curved bend curving in a particular direction away from where the grommet seats in the through-opening.

13. A motor vehicle wiring harness as set forth in claim 12 wherein the endless perimeter lip comprises a shape defined by a lower edge, side edges extending upward from opposite ends of the lower edge, and an upwardly convex upper edge extending between upper ends of the side edges.

14. A motor vehicle wiring harness as set forth in claim 12 wherein the through-passage comprises an entrance and an exit, with the transverse cross section of the entrance being larger in area than the transverse cross section of the exit.

15. A motor vehicle wiring harness as set forth in claim 12 wherein the curved bend comprises substantially a 90° bend, and the grommet further comprises an extension of the through-passage beyond the 90° bend.

16. A motor vehicle wiring harness as set forth in claim 15 wherein the extension has a narrowing taper in the direction away from the 90° bend.

17. A motor vehicle wiring harness as set forth in claim 16 further including a strap that girdles the outside of a relatively more narrow portion of the narrowing taper of the extension to tightly band the extension to the wire bundle.

18. A motor vehicle wiring harness as set forth in claim 16 including a tab on the exterior of the bend that can be gripped for pulling the grommet into seating in a through-opening.

19. A motor vehicle comprising:
an occupant compartment;
an engine compartment forward of the occupant compartment;
and a wiring harness extending through a wall separating the occupant compartment and the engine compartment from each other and comprising a grommet that is secured at a fixed location on a wire bundle that passes through the grommet;
the grommet comprising an endless perimeter lip having a polarized endless groove;
the wall comprising a through-opening having a polarized endless perimeter in which the grommet seats via the grommet's endless perimeter lip and the polarized groove, and the engine compartment side of the grommet comprising a bend that curves generally downward and away from the wall to direct the bundle generally downward on the engine compartment side;
wherein the through-opening is disposed to one lateral side of a vehicle fore-aft centerline, the endless perimeter of the through-opening is polarized similarly to the polarized groove in the lip to allow the grommet to seat in the through-opening only in an orientation that causes the bend in the grommet on the engine compartment side of the through-opening to curve downwardly and away from the wall, and the wire bundle has a length extending from the grommet to terminate in one or more connectors connecting to one or more mating connectors of another wiring harness on the other lateral side of the vehicle fore-aft centerline.

20. A motor vehicle as set forth in claim 19 wherein the another wiring harness comprises a powertrain wiring harness comprising the one or more mating connectors of another wiring harness and those one or more mating connectors are mated with the one or more connectors of the wire bundle to connect wires in the wire bundle to one or more powertrain electrical components.

* * * * *